(12) United States Patent
Lee et al.

(10) Patent No.: US 8,129,448 B2
(45) Date of Patent: Mar. 6, 2012

(54) METHOD OF PREPARING POLYMER MODIFIED PIGMENTS

(75) Inventors: Sze-Ming Lee, Westford, MA (US); Elizabeth G. Burns, Windham, NH (US); Sarah A. Mandeville, Hopedale, MA (US); Robert J. Nick, Pepperell, MA (US); Dave S. Pope, Andover, MA (US)

(73) Assignee: Cabot Corporation, Boston, MA (US)

( * ) Notice: Subject to any disclaimer, the term of this patent is extended or adjusted under 35 U.S.C. 154(b) by 412 days.

(21) Appl. No.: 12/316,997

(22) Filed: Dec. 18, 2008

(65) Prior Publication Data

US 2010/0160536 A1    Jun. 24, 2010

(51) Int. Cl.
| | |
|---|---|
| B41J 2/01 | (2006.01) |
| B41J 2/17 | (2006.01) |
| C08K 9/00 | (2006.01) |
| C09D 5/00 | (2006.01) |
| C09D 11/00 | (2006.01) |
| G01D 11/00 | (2006.01) |

(52) U.S. Cl. .............. 523/160; 347/1; 347/95; 347/100; 523/161; 523/200; 523/205; 523/206

(58) Field of Classification Search .................. 523/160, 523/161, 200, 205, 206; 347/1, 95, 100
See application file for complete search history.

(56) References Cited

U.S. PATENT DOCUMENTS

| | | | | |
|---|---|---|---|---|
| 2,689,232 | A * | 9/1954 | Gerhart ......................... | 524/313 |
| 4,014,844 | A   | 3/1977 | Vidal et al. | |
| 5,141,556 | A   | 8/1992 | Matrick | |
| 5,634,971 | A * | 6/1997 | Baker ........................... | 106/499 |
| 5,698,016 | A   | 12/1997 | Adams et al. | |
| 5,795,376 | A   | 8/1998 | Ide et al. | |
| 5,952,429 | A   | 9/1999 | Ikeda et al. | |
| 5,964,935 | A   | 10/1999 | Chen et al. | |
| 6,068,688 | A   | 5/2000 | Whitehouse et al. | |
| 6,110,994 | A   | 8/2000 | Cooke et al. | |
| 6,150,433 | A   | 11/2000 | Tsang et al. | |
| 6,221,932 | B1  | 4/2001 | Moffatt et al. | |
| 6,235,829 | B1  | 5/2001 | Kwan | |
| 6,336,965 | B1  | 1/2002 | Johnson et al. | |
| 6,372,820 | B1  | 4/2002 | Devonport | |
| 6,432,194 | B2  | 8/2002 | Johnson et al. | |
| 6,458,458 | B1  | 10/2002 | Cooke et al. | |
| 6,472,471 | B2  | 10/2002 | Cooke et al. | |
| 6,478,863 | B2  | 11/2002 | Johnson et al. | |
| 6,534,569 | B2 * | 3/2003 | Belmont et al. ............... | 523/333 |
| 6,641,656 | B2  | 11/2003 | Yu et al. | |
| 6,699,319 | B2 * | 3/2004 | Adams et al. .................. | 106/476 |
| 6,723,783 | B2  | 4/2004 | Palumbo et al. | |
| 7,005,461 | B2  | 2/2006 | Sanada et al. | |
| 7,030,174 | B2  | 4/2006 | Yatake | |
| 7,459,491 | B2  | 12/2008 | Tyvoll et al. | |
| 7,544,238 | B1  | 6/2009 | Belmont | |
| 2001/0003263 | A1 | 6/2001 | Johnson et al. | |
| 2002/0147252 | A1 | 10/2002 | Adams | |
| 2003/0195291 | A1 | 10/2003 | Lamprey et al. | |
| 2003/0213410 | A1 | 11/2003 | Adams et al. | |
| 2004/0007152 | A1 | 1/2004 | Palumbo | |
| 2005/0256247 | A1 | 11/2005 | Kano et al. | |
| 2006/0189717 | A1 | 8/2006 | Johnson et al. | |
| 2007/0021530 | A1 | 1/2007 | Palumbo | |
| 2007/0126839 | A1 | 6/2007 | Kelly-Rowley et al. | |
| 2007/0129462 | A1 | 6/2007 | Ma | |
| 2007/0129463 | A1 | 6/2007 | Ma et al. | |
| 2008/0177003 | A1 | 7/2008 | Lee et al. | |
| 2009/0192248 | A1 | 7/2009 | Palumbo et al. | |

FOREIGN PATENT DOCUMENTS

| | | |
|---|---|---|
| WO | WO 01/51566 | 7/2001 |
| WO | WO 03/095568 | 11/2003 |

* cited by examiner

*Primary Examiner* — Patrick Niland

(57) ABSTRACT

The present invention relates to a method of preparing a polymer modified pigment comprising the steps of, combining, in any order, a modified pigment comprising a pigment having attached at least one reactive group, a polymer comprising at least one functional group, and a non-reactive diluent, to form a reaction mixture, reacting the polymer and the modified pigment in the reaction mixture to form a mixture comprising the polymer modified pigment and the non-reactive diluent; and removing the non-reactive diluent from the mixture to form the polymer modified pigment. Also disclosed are the resulting polymer modified pigments and inkjet ink compositions comprising them.

33 Claims, No Drawings

METHOD OF PREPARING POLYMER MODIFIED PIGMENTS

BACKGROUND OF THE INVENTION

1. Field of the Invention

The present invention relates to methods of preparing polymer modified pigments, as well as polymer modified pigments and inkjet ink compositions comprising the same.

2. Description of the Related Art

The surface of pigments contains a variety of different functional groups, and the types of groups present depend on the specific class of pigment. Several methods have been developed for grafting materials and, in particular, polymers, to the surface of these pigments. For example, it has been shown that polymers can be attached to carbon blacks containing surface groups such as phenols and carboxyl groups. However, methods that rely on the inherent functionality of a pigment's surface cannot be applied generally because not all pigments have the same specific functional groups.

Other methods for the preparation of polymer modified pigment products have also been developed. For example, U.S. Pat. Nos. 7,056,962, 6,478,863, 6,432,194, 6,336,965, and as well as U.S. Patent Application Publication No. 2006-0189717 describe methods for attaching polymers to pigments through the use of a diazonium salt. Also, U.S. Pat. Nos. 7,173,078, 6,916,367, 6,911,073, 6,723,783, 6,699,319, 6,472,471, and 6,110,994 disclose methods of preparing a polymer modified pigment by reacting polymer and a pigment having an attached reactive group. Furthermore, modified pigments having attached polymeric groups have also been disclosed in U.S. Patent Application Publication No. 2008-0177003 Al, which utilizes a polymer in the form of a melt.

In general, each of these related to a method of preparing pigments having attached at least one polymeric group sometimes referred to as a "grafting onto" process, which generally involves the reaction of polymeric materials having reactive functional groups onto the surface of a particle, such as a pigment. For this type of process, polymer that has reacted with the surface may cause steric hindrance, thereby preventing additional polymeric material from reaching the surface of the pigment and limiting the amount of polymer attached to the pigment surface. In general, such approaches have a lower level of efficiency of polymer attachment (expressed as a percentage of attached polymer versus the amount of polymer added). Thus, to obtain a pigment having a high level of attached polymer, a large excess of polymer is needed.

Alternative methods for attaching polymeric groups to a pigment include so-called "grafting through" or "grafting from" processes. A "grafting through" method generally involves the polymerization of monomers in the presence of a modified pigment having attached at least one polymerizable group. However, similar to the "grafting to" method, the presence of attached polymer may limit further attachment since the attached polymer may sterically hinder the growing polymer chains from reaching the polymerizable group on the pigment surface, thus lowering the efficiency of the attachment.

By comparison, a "grafting from" process typically comprises forming initiation sites on the surface of the pigment and polymerizing monomers directly from the initiation site. Examples of such polymerization processes include atom transfer radical polymerization (ATRP), stable free radical (SFR) polymerization, and reversible addition-fragmentation chain transfer polymerization (RAFT), as well as ionic polymerizations such as group transfer polymerization (GTP). While such methods typically afford a higher grafting density due to the much higher diffusion rate of small molecules (i.e., monomers) as compared to polymers in the "grafting onto" or "grafting through" processes, these methods also generally require the preparation of a specific initiator-modified pigments along with the use of special reaction conditions to grow the polymer, adding additional cost and complexity to the process.

Therefore, while these methods provide modified pigments having attached polymeric groups, there remains a need for improved methods for attaching polymers to pigments, with improved attachment efficiency, as well as polymer modified pigments having higher levels of attached polymer.

SUMMARY OF THE INVENTION

The present invention relates to a method of preparing a polymer modified pigment comprising the steps of: i) combining, in any order, a modified pigment, a polymer, and a non-reactive diluent to form a reaction mixture, ii) reacting the modified pigment and the polymer in the reaction mixture to form a mixture comprising the polymer modified pigment and the non-reactive diluent; and iii) removing the non-reactive diluent from the mixture to form the polymer modified pigment. The non-reactive diluent and the polymer are combined in a ratio of at least about 1 part non-reactive diluent to 1 part polymer. The modified pigment comprises a pigment having attached at least one reactive group, and the polymer comprises at least one functional group, wherein the functional group of the polymer is capable of reacting with the reactive group of the pigment. The polymer modified pigment comprises the pigment having attached at least one polymeric group, and wherein the polymeric group comprises the polymer.

The present invention further relates to a method of preparing a polymer modified pigment comprising the steps of: i) combining, in any order, a pigment, an aromatic amine, a diazotizing agent, a polymer, and a non-reactive diluent, to form a reaction mixture, ii) reacting the pigment, the aromatic amine, and the diazotizing agent in the reaction mixture to form a modified pigment; iii) reacting the polymer and the modified pigment in the reaction mixture to form a mixture comprising the polymer modified pigment and the non-reactive diluent; and, iv) removing the non-reactive diluent from the mixture to form the polymer modified pigment. The non-reactive diluent and the polymer are combined in a ratio of at least about 1 part non-reactive diluent to 1 part polymer. The modified pigment comprises a pigment having attached at least one reactive group, and the polymer comprises at least one functional group, wherein the functional group of the polymer is capable of reacting with the reactive group of the pigment. The polymer modified pigment comprises the pigment having attached at least one polymeric group, and wherein the polymeric group comprises the polymer.

The present invention further relates to a polymer modified pigment comprising a pigment having attached at least one polymeric group. The polymer modified pigment comprises the reaction product of a modified pigment comprising the pigment having attached at least one reactive group and a polymer comprising at least one functional group, wherein the functional group of the polymer reacts with the reactive group of the modified pigment to form the polymer modified pigment. The polymer has an acid number of between about 30 and 110, and the polymer modified pigment has a weight ratio of polymer to modified pigment of less than or equal to 2:1. Inkjet ink compositions comprising this polymer modified pigment are also disclosed.

It is to be understood that both the foregoing general description and the following detailed description are exemplary and explanatory only and are intended to provide further explanation of the present invention, as claimed.

DETAILED DESCRIPTION OF THE INVENTION

The present invention relates to a method of forming a polymer modified pigment, to the polymer modified pigment, and uses thereof.

The method of the present invention comprises the step of combining a modified pigment, a polymer, and a non-reactive diluent to form a reaction mixture. Each of these components will be described in more detail below. These components may be combined in any order. For example, the polymer and non-reactive diluent may be combined to form a polymer mixture, which is subsequently combined with the modified pigment. Other combinations are also possible and will be apparent to one of ordinary skill in the art.

The modified pigment comprises a pigment having attached at least one reactive group. The pigment of the modified pigment is a solid material, generally in the form of a particulate or in a form readily formed into a particulate, such as a pressed cake. The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regale 330, Regale 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). Preferably the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

The pigment can have a wide range of BET surface areas, as measured by nitrogen adsorption, depending on the desired properties of the pigment. Preferably, the pigments have a BET surface area between about 10 $m^2/g$ and about 1500 $m^2/g$, more preferably between about 20 $m^2/g$ and about 600 $m^2/g$ and most preferably between about 50 $m^2/g$ and about 300 $m^2/g$. If the desired surface area is not readily available for the desired application, it is also well recognized by those skilled in the art that the pigment may be subjected to conventional size reduction or comminution techniques, such as ball or jet milling or sonication, to reduce the pigment to a smaller particle size, if desired. Also, the pigment can have a wide variety of primary particle sizes known in the art. For example, the pigment may have a primary particle size of between about 5 nm to about 100 nm, including about 10 nm to about 80 nm and 15 nm to about 50 nm. In addition, the pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g. Also, the pigment may be an organic colored pigment having an oil adsorption value (as described in ISO 787 T5) of from about 5 to 150 mL/100 g, including from about 10 to 100 mL/100 g and from about 20 to 80 mL/100 g.

The pigment may also be a pigment that has been oxidized using an oxidizing agent in order to introduce ionic and/or ionizable groups onto the surface. Oxidized pigments prepared in this way have been found to have a higher degree of oxygen-containing groups on the surface. Suitable oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such as sodium hypochlorite, halites, halates, or perhalates (such as sodium chlorite, sodium chlorate, or sodium perchlorate), oxidizing acids such as nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, pigments prepared using other surface modification methods to introduce ionic or ionizable groups onto a pigment surface, such as chlorination and sulfonylation, may also be used.

The modified pigment comprises a pigment having attached at least one reactive group, described in more detail below. In one embodiment, the modified pigment is an oxidized pigment, comprising oxygen-containing reactive groups, and may be prepared using any of the methods described above. In a second embodiment, the modified pigment comprises a pigment having attached at least one organic group, wherein the organic group comprises the reactive group. Preferably, the organic group is directly attached. Such modified pigments may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants. Other methods for preparing the modified pigments include reacting a pigment having available functional groups with a reagent comprising the organic group, such as is described in, for example, U.S. Pat. No. 6,723,783, which is incorporated in its entirety by reference herein. Such functional pigments may be prepared using the methods described in the references incorporated above. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

The reactive group of the modified pigment used in the method of the present invention is a group that is capable of reacting with the polymer. This reactive group can be a nucleophilic group or an electrophilic group, depending on the nature of the reaction with the polymer, which is described in more detail below. For example, the reactive group of the modified pigment may be an electrophilic group such as a carboxylic acid or ester; an acid chloride; a sulfonyl chloride; an acyl azide; an isocyanate; a ketone; an aldehyde; an anhydride; an amide; an imide; an imine; an $\alpha,\beta$-unsaturated ketone, aldehyde, or sulfone; an alkyl halide; an epoxide; an alkyl sulfonate or sulfate such as a (2-sulfatoethyl)-sulfone group; an aromatic compound which undergoes an addition-elimination reaction; or salts or derivatives thereof, or any combination thereof. Also, the reactive group of the modified pigment may be a nucleophilic group such as an amine; a hydrazine; an alcohol; a thiol; a hydrazide; an oxime; a triazene; a carbanion; or salts or derivatives thereof, or any combination thereof. Preferably, the reactive group is a carboxylic acid group; an anhydride group; an amine group, such as an alkyl amine group; an alkyl sulfate group; or a salt thereof. For example, the reactive group can be an amine group or salt thereof such as a benzylamine, phenylethylamine, phenyleneamine, or aminoalkylamine group such as an —$SO_2$-ALK1-NH-ALK2—$NH_2$ group, wherein ALK1 and ALK2, which can be the same or different, are C2-C8 alkylene groups.

The polymer used in the method of the present invention forms the polymeric group of the modified pigment of the present invention. A variety of different types of polymers may be used and can be a homopolymer, copolymer, terpolymer, or can contain any number of different repeating units, including a random polymer, alternating polymer, graft polymer, block polymer, hyperbranched or dendritic polymer, comb-like polymer, or any combination thereof. The polymer can have a weight average molecular weight of less than or equal to about 50,000. For example, the polymer can have a weight average molecular weight of less than or equal to about 25,000, such less than or equal to about 15,000 or 10,000. The polymer can also have a weight average molecular weight of greater than or equal to about 1,000. Also, the polymer may be in the form of a liquid, a powder, or a polymer melt, depending on the specific conditions used to prepare the modified pigment, described in more detail below.

Suitable examples of polymers that can be used in the method of the present invention include polyamines; polyamides; polycarbonates; polyelectrolytes; polyesters; polyethers (such as polyalkyleneoxides); polyvinylethers, polyols (such as polyhydroxybenzenes and polyvinyl alcohols); polyimides; polymers containing sulfur (such as polyphenylene sulfide); acrylic polymers; polyolefins, including those containing halogens (such as polyvinyl chloride and polyvinylidene chloride); fluoropolymers; polyurethanes; polyacids; polyanhydride, comprising at least one anhydride functional group; or salts or derivatives thereof, or any combination thereof. For example, the polymer can be a polyamine, including a linear or branched polyamine, such as polyethyleneimine (PEI) or derivatives thereof; oligomers of ethyleneimine (such as pentaethylenehexamine, PEHA) or derivatives thereof; polyamidoamine (PAMAM), such as Starburst® polyamidoamine dendrimers; or any combination thereof. Also, the polymer can be a polyacid, including an acrylic or methacrylic acid homo- and copolymer, such as polyacrylic or polymethacrylic acid and poly(styrene-acrylic acid) or poly(styrene-methacrylic acid); or a hydrolyzed derivative of maleic anhydride-containing polymer, such as styrene-maleic acid polymer. In addition, the polymer can be formed from various known acrylic monomers. Specific examples of styrene-acrylic acid polymers include Vancryl 68 (available from Cytec); Trudot IJ-4659, IJ-4650, IJ-4655, IJ-4675, IJ-4680 (available from MeadWestvaco); Carboset 7700, CA7121, CR-760, CR-761, CR-763, CR-764, CR-765, CR-7700, GA-1105, GA4028, GAW-7223, RTU805, SA-860 (available from Lubrizol); and Joncryl 67, 611, HPD671, ECO 675, 678, 680, 682, 683, ECO 684, 690, 693, HPD 696 (available from BASF).

Preferably, the polymer comprises at least one group that provides the resulting polymer modified pigment with at least one desirable property. For example, the polymer can comprise at least one hydrophilic group, which can improve the dispersion stability of the polymer modified pigment in aqueous solutions, or at least one hydrophobic group, which can improve the dispersion stability of the polymer modified pigment in non-polar solutions. Also, the polymer may comprise at least one steric stabilization group, which can reduce the tendency of the pigment to agglomerate through steric interactions.

For example, the polymer may comprise at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4{}^+$, acetate, $NO_3^-$, $SO_4^{-2}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —$COO^-$, —$SO_3^-$, —$OSO_3^-$, —$HPO_3^-$; —$OPO_3^{-2}$, or —$PO^{-2}$, and specific examples of an anionizable group can include —COOH, —$SO_3H$, —$PO_3H_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —$NR'_2H^+$, where R' represent an organic group, such as a substituted or unsubstituted aryl or alkyl groups.

Also, the polymer may comprise at least one non-ionic group. Examples include alkylene oxide groups of from about 1 to about 12 carbons and polyols, such as a —$CH_2$—$CH_2$—O— group, a —$CH(CH_3)$—$CH_2$—O— group, a —$CH_2$—$CH(CH_3)$—O— group, a —$CH_2CH_2CH_2$—O— group, or combinations thereof. These non-ionic groups may further comprise at least one nucleophilic or electrophilic group, such as an —OH group.

The method of the present invention has been found to be particularly useful for polymers having a low acid number.

Thus, for this method, the polymer may be an acidic group containing polymer having an acid number of less than or equal to about 200, such as less than or equal to about 150, less than or equal to about 110, or less than or equal to about 100. Preferably, the acid number of the polymer is greater than or equal to about 30. Thus, the polymer may be an acidic group containing polymer having an acid number of from about 30 to about 200, such as from about 30 to about 110, from about 110 to about 150, or from about 150 to about 200.

The polymer used in the method of the present invention comprises at least one functional group, which is a group that is capable of reacting with the reactive group of the modified pigment. Various types of reactions can occur between the functional group of the polymer and the reactive group of the modified pigment, including, for example, an $S_N2$ displacement reaction, a condensation reaction (such as an acylation reaction, an esterification reaction, an amidation reaction, or an imide or imine-forming reaction), a 1,2 or 1,4 addition reaction (such as a Diels-Alder cycloaddition reaction), a Friedel-Crafts reaction, or any number of other known chemical reactions which lead to the formation of a covalent bonds. Preferably, the functional group of the polymer and the reactive group of the pigment are complementary groups capable of reacting through a nucleophilic/electrophilic substitution or addition. Thus, preferably the functional group is a nucleophilic group or an electrophilic group, depending on the nature of the reactive group of the modified pigment. For example, if the reactive group of the modified pigment is an electrophilic group, the functional group of the polymer is a nucleophilic group. If the reactive group of the polymer is a nucleophilic group, the functional group of the polymer is an electrophilic group. The functional group of the polymer may be any of those described above for the reactive group of the modified pigment. Furthermore, the functional group of the polymer may be the same or different than the groups described above for providing dispersion stability to the polymer modified pigment, such as the ionic or ionizable groups. For example, the functional group may be a carboxylic acid group, an anhydride group, an amine group, such as an alkyl amine, an alkyl sulfate, or a salt thereof.

Examples of specific combinations of polymer and modified pigment include a modified pigment comprising a pigment having attached at least one amine group or salt thereof, and a polymer comprising at least one carboxylic acid group or salt thereof. Also, the polymer may comprise at least one amine group and the modified pigment may be a pigment having attached at least one alkyl sulfate group or at least one carboxylic acid group. Other combinations will be known to one skilled in the art, based on the disclosure provided herein.

The non-reactive diluent used in the method of the present invention is a material that does not substantially react with the modified pigment, and, more particularly, is non-reactive toward the reactive group of the modified pigment. Thus, the non-reactive diluent does not compete appreciably with the polymer, which comprises at least one functional group that does react with the reactive group of the pigment. In essence, the non-reactive diluent is present to "dilute" the polymer without reacting substantially with the pigment. The non-reactive diluent may be capable of reacting with the polymer, but that reaction should be reversible and thus would not interfere with the removal of the non-reactive diluent, which described in more detail below. Mixtures of diluents may also be used.

For example, the non-reactive diluent may be a hydrophobic material such as an oil or resin that is not appreciably miscible and/or soluble in water. The hydrophobic material may be a liquid, or it may be in the form of a waxy material having a low melting point, such as below approximately 50° C. The hydrophobic material may also be miscible, soluble, or dispersible in the polymer, but is one that may be readily removed from the polymer, such as by distillation. Specific examples of non-water miscible oils or resins include mineral oil, silicone oil, paraffin, and branched polyethylenes (such as Vybar™), hydrophobically modified polyvinylpyrrolidone (such as Ganex™), polyethylene, and polystyrene.

Also, the non-reactive diluent may be a salt having a melting point that is less than or equal to about 120° C. The salt may be an organic salt or an inorganic salt, and is preferably a salt that is either soluble in the polymer or water soluble. Specific examples include ammonium hydrogen sulfate, tetrabutyl ammonium bromide, and tetramethyl ammonium nitrate.

In addition, the non-reactive diluent may be a polymer that is soluble in water but does not contain any acidic functional groups. This polymer can have a weight average molecular weight that is similar to that of the polymer, described above, but, since it is not reactive with the modified pigment, can be readily removed from the resulting polymer modified pigment, either along with or separate from any remaining polymer used to form the polymer modified pigment. Specific examples of water soluble non-acidic polymers include polyethers, such as polyalkylene glycols (including polyethylene glycol and copolymers of ethylene glycol), polyvinyl alcohols and copolymers having a vinyl alcohol group, polyvinyl methyl ethers, polyvinyl pyrrolidones, and polyoxazolines, such as poly-2-ethyloxazoline.

Furthermore, the non-reactive diluent may also be a high boiling solvent. As such, the solvent may be either soluble or miscible in water or may be water insoluble but preferably has a boiling point that is greater than or equal to about 100° C., such as greater than or equal to about 110° C., including greater than or equal to about 150° C., greater than or equal to about 160° C., or greater than or equal to about 170° C. In one embodiment, the boiling point is greater than the temperature needed to form the polymer modified pigment. The solvent may be a good solvent for the polymer, but it is able to be removed from the polymer modified pigment, such as by distillation or diafiltration., which is particularly useful for high boiling water soluble or miscible solvents. Specific examples of high boiling water soluble solvents include 2-pyrrolidone (2P), N-methyl pyrrolidone (NMP), glycols (including ethylene glycol, diethylene glycol, triethylene glycol, methyl glycol, methyl diglycol, methyl triglycol, butyl glycol, butyl diglycol, butyl polygycol, ethylene glycol dimethyl ether, diethylene glycol dimethyl ether, tetraethylene glycol dimethyl ether, diethylene glycol dibutyl ether, dipropylene glycol dimethyl ether), glycerine, sulfolane, ketones such as acetone and methyl ethyl ketone (MEK), dimethylsulfoxide (DMSO), dimethylformamide (DMF), and N,N-dimethylacetamide (DMAC). Specific examples of high boiling water insoluble solvents include aromatic solvents such as benzene and xylene, alkanes such as heptane and octane, ethers (including glymes), and ketones (including diisobutyl ketone (DIBK), methyl isobutyl ketone (MIBK), methyl n-amyl ketone, methyl i-amyl ketone, isophorone, and Ecosoft Solvent IK available from Dow).

As described above, the present invention comprises the step of combining, in any order, a modified pigment, a polymer, and a non-reactive diluent to form a mixture. The amounts of each component may vary depending on a variety of factors, including the type and molecular weight of the polymer and the reactivity of the functional group and/or the reactive group. For example, the weight ratio of the amount of polymer and the non-reactive diluent is at least about 1:1— that is, at least about 1 part by weight non-reactive diluent to about 1 part by weight polymer. Preferably, the weight ratio is greater than 1:1, such as greater than or equal to about 2 parts by weight non-reactive diluent to about 1 part by weight polymer (2:1), including greater than or equal to about 3:1, about 5:1, or about 10:1. Thus, the amount of non-reactive diluent is preferably greater than the amount of polymer, and, as described above, this material is used to "dilute" the polymer.

Furthermore, the total amount of the non-reactive diluent and the polymer compared to the amount of the modified pigment can also be varied. In general, the greater the total amount of polymer and non-reactive diluent, the greater the amount of attached polymer for the resulting polymer modified pigment (i.e., the greater the polymer to pigment ratio, which is the weight ratio of the amount of polymer and the amount of pigment). However, this must also be balanced with cost. Thus, the weight ratio of the total amount of the polymer and non-reactive diluent to the amount of modified pigment can be at least about 1:1—that is, at least 1 part by weight polymer and non-reactive diluent to about 1 part by weight modified pigment. Preferably, the amount of modified pigment is much less than the total amount of polymer and non-reactive diluent. For example, preferably, the ratio is greater than or equal to about 3:1 and more preferably about 5:1, including greater than or equal to about 6.5 parts by weight polymer and non-reactive diluent to 1 part by weight modified pigment (6.5:1).

In addition to combining the modified pigment, the polymer, and the non-reactive diluent to form a mixture, optionally an aqueous solvent may also be added, which is a solvent containing water. The aqueous solvent can be, for example, water or mixtures containing at least 50% by volume water with water miscible or soluble solvents, such as alcohols. The aqueous solvent may be combined either separately or along with one of the other components, including the modified pigment, the polymer, or the non-reactive diluent. For example, the modified pigment may be combined with the recited components as an aqueous dispersion. Also, the polymer and/or non-reactive diluent may be added as either dispersions or solutions in water. Other additives may also be present, such as for example, surfactants, stabilizers, phase transfer catalysts, and the like. In particular, the aqueous solvent may be either acidic or basic, depending on the nature of the components. In this way, the aqueous solvent can provide a means to adjust the pH of the reaction mixture, which may be preferred for some reactions between the functional group of the polymer and the reactive group of the modified pigment. Also, the appropriate pH can be useful in the step of removing the non-reactive diluent. In addition, when an aqueous solvent is included, the resulting polymer modified pigment may be in the form of an aqueous dispersion, which has been found to be particularly preferred for some applications, described below. Use of the appropriate pH can provide improved stability for the polymer modified pigment dispersion. For examples, when the polymer comprises at least one anionic group or anionizable group, a base, such as lithium hydroxide, sodium hydroxide, potassium hydroxide, and tetraalkyl ammonium hydroxides, as well as various amines, may be used to provide a stable aqueous dispersion of polymer modified pigment.

Thus, the method of the present invention comprises the step of combining, in any order, a modified pigment, a polymer, a non-reactive diluent, and an optional aqueous solvent, to form a reaction mixture. The step of combining these components can occur at any temperature and for any time sufficient to produce the desired reaction mixture. The time and temperature will depend on a variety of factors, including, for example, the type of polymer, the type and reactivity of both the reactive group of the modified pigment and the functional group of the polymer, as well as the relative amounts of each component. For example, the time for combining the components can be varied but is typically between about 5 minutes and 48 hours, including between 30 minutes and 24 hours and between 1 hour and 12 hours.

The temperature for the step of combining the components can also vary and may be controlled by any method known in the art. Generally, the temperature is between about 20° C. and 250° C., including between about 50° C. and 200° C. and between about 70° C. and 180° C. In one embodiment, the components are combined at a temperature sufficient to form a melt of the polymer. Thus, for this embodiment, the temperature for combining the components is greater than or equal to the glass transition temperature ($T_g$) of the polymer, preferably greater than or equal to the polymer's melting temperature ($T_m$). In another embodiment, the temperature for combining the components is chosen based on the nature of the non-reactive diluent. For example, if the non-reactive diluent is a water soluble, non-acidic polymer, the temperature can be greater than or equal to the $T_g$ or $T_m$ of this polymer. If the non-reactive diluent is a non-water miscible oil or high boiling, non-aqueous solvent, the temperature for combining is preferably below the boiling point of the non-reactive diluent. Also, if the non-reactive diluent is a low melting organic or inorganic salt, the temperature for combining the components can be above the melting temperature of the non-reactive diluent. For both of these embodiments, combining the components at a temperature in which the polymer and/or the non-reactive diluent is in a liquid form enables ready incorporation of the components into the reaction mixture and provides a mixture in which each of the components is thoroughly mixed.

The step of combining the components may take place in any suitable vessel, and the components may be added to the vessel either in several increments, in one single increment, or continuously. In a preferred embodiment of the method of the present invention, the components are combined in equipment capable of mixing low viscosity materials. For example, the components may be combined by stirring with a power of less than or equal to 50 watts. Low shear mixers or agitators that can be used for low viscosity systems are described in Perry's Chemical Engineer's Handbook ($6^{th}$ Edition), Chapter 19, pages 19-5 through 19-14. Such devices include the marine-type impeller mixer, turbine mixers, anchor blades, disperser blades, rotor-stator devices and the like. These agitation devices may be mounted vertically, horizontally or at an angle. Mixing may be accomplished using intersecting fluid streams. The components may be contained in the mixer, recirculated, or the system may be continuous, and, thus, the low viscosity mixers may be either batch, semi-continuous, or continuous mixers.

The method of the present invention further comprises the step of reacting the modified pigment and the polymer in the reaction mixture comprising the modified pigment, polymer, and non-reactive diluent to form a mixture comprising the polymer modified pigment and the non-reactive diluent. The step of reacting these components can occur at any temperature and for any time sufficient to produce the polymer modified pigment and will depend on a variety of factors, including, for example, the type of polymer, the type and reactivity of both the reactive group of the modified pigment and the functional group of the polymer, as well as the relative amounts of each component. Any of the conditions described above relating to the step of combining the modified pigment, the polymer, and the non-reactive diluent can be used for this reaction step, including low viscosity mixing conditions and/or temperatures in which the polymer, the non-reactive diluent, or both are in a liquid form (such as a polymer melt). Also, the conditions for the reacting step can be the same or different than the combining conditions. Thus, in one embodiment, these steps occur simultaneously, in which the components are combined to form a reaction mixture while reacting to form the mixture comprising the polymer modified pigment and the non-reactive diluent.

In a specific embodiment of the method of the present invention, the modified pigment is prepared in the presence of the polymer and non-reactive diluent. Thus, for this embodiment, the method comprises the step of combining, in any order, a pigment, an aromatic amine, a diazotizing agent, a polymer, and a non-reactive diluent, to form a reaction mixture. The pigment, the aromatic amine, and the diazotizing agent in the reaction mixture are reacted to form a modified pigment comprising the pigment having attached at least one reactive group, and this modified pigment is then reacted with the polymer to form a mixture comprising the polymer modified pigment and the non-reactive diluent. Alternatively, these reaction steps occur simultaneously—i.e., as the modified pigment is formed it is reacted with the polymer. The modified pigment, polymer, and non-reactive diluent may be any of those described above.

For this embodiment, the aromatic amine may be may be any aromatic or heteroaromatic compound substituted with an amine group, including, for example, an aniline derivative (i.e., a substituted benzeneamine). The aromatic amine further comprises the reactive group, described in more detail above. Other substituents besides the reactive groups may also be present on the aromatic amine, as long as these substituents do not interfere with formation of the modified pigment. The diazotizing agent may be any reagent that reacts with an amine group, particularly the amine group of the aromatic amine, to form a diazonium salt. Examples include nitrous acid and nitrite salts. Preferably, the diazotizing agent is a salt having a nitrite counterion such as sodium nitrite, potassium nitrite, or calcium nitrite.

The method of the present invention further comprises the step of removing the non-reactive diluent from the mixture comprising the polymer modified pigment and the non-reactive diluent, thereby forming the polymer modified pigment. Conditions for removing the non-reactive diluent will depend on the type of non-reactive diluent and the form of the mixture comprising the polymer modified pigment. For example, if the mixture is in the form of a liquid due to the type of non-reactive diluent, the non-reactive diluent can generally be removed by filtration or distillation. If, for example, the mixture is in the form of a solid, generally a solvent can be added to either dissolve or disperse the non-reactive diluent, which can then be removed from the polymer modified pigment dispersion by any technique known in the art, including filtration. As a particular example, the step of removing the non-reactive diluent may comprise adding an aqueous solvent, such as water, to the mixture to form an aqueous dispersion of the polymer modified pigment. If the non-reactive diluent is soluble in water, such as a salt, the non-reactive diluent can be removed, along with other water soluble impurities and other undesirable free species using known techniques such as ultrafiltration/diafiltration, reverse osmosis, or ion exchange. If the non-reactive diluent is not water soluble, the non-reactive diluent therefore forms a separate phase and therefore can be removed by phase separation, filtration, or distillation. Other methods will be known to one skilled in the art.

Furthermore, if the non-reactive diluent reacts reversibly with the polymer to form an adduct, this step of removing the non-reactive diluent from the mixture comprising the polymer modified pigment may further comprise coverting the adduct to polymer and non-reactive diluent. This can be accomplished using any technique known in the art, depending on the type of reaction that forms the adduct, including, for example, adding an acidic or basic aqueous solvent and heating. Alternatively, the adduct may be removed along with the non-reactive diluent, using any of the techniques described above.

The method of the present invention is a method of forming a polymer modified pigment, which is the reaction product of the modified pigment and the polymer and is a pigment comprising an attached polymeric group, wherein the polymeric group comprises the polymer. While it is known in the art that the functional group of the polymer can react with the reactive group of the modified pigment to produce a polymer modified pigment, it would have been expected that this reaction would only occur efficiently if a large amount of polymer is used compared to the amount of modified pigment. Also, high viscosity, high concentration mixing conditions would be expected to be preferred. This would be particularly expected when the polymer has a relatively low acid number, since such a polymer has a low amount of groups capable of reacting with the pigment. Surprisingly, in the method of the present invention, it has been found that this reaction can occur using a much lower amount of polymer when used in combination with a non-reactive diluent, which is used in amounts greater than or equal to the amount of the polymer. It would have been expected that "diluting" the reaction of the polymer and the modified pigment with a diluent, along with using low amounts of polymer, would result in poor attachment efficiencies (i.e., low polymer/pigment ratios for the resulting polymer modified pigment). However, it has surprisingly been found that polymer modified pigments having a high polymer to pigment ratio can be achieved, even under these highly diluted conditions. Also, surprisingly, low viscosity mixing conditions can be used without affecting the polymer/pigment ratio. The combination of low viscosity conditions and less added polymer has significant economic, processing, and performance benefits. In addition, it has also been surprisingly found that this method is particularly useful for preparing polymer modified pigments from low acid number polymers, especially those having an acid number of less than or equal to about 150, that do not have a high polymer to modified pigment ratio.

Thus the present invention further relates to a polymer modified pigment comprising a pigment having attached at least one polymeric group. The polymer modified pigment comprises the reaction product of a modified pigment comprising the pigment having attached at least one reactive group and a polymer comprising at least one functional group. The modified pigment and the polymer can be any of those described above but is preferably a low acid polymer, having an acid number of less than or equal to about 200, especially between about 30 and about 110. Furthermore, the polymer modified pigment has a weight ratio of polymer to modified pigment of less than or equal to 2:1, and, more particularly, less than or equal to 1:1.

The polymer modified pigment of the present invention may be used in a variety of applications, including, for example, plastic compositions, aqueous or non-aqueous inks, aqueous or non-aqueous coatings, rubber compositions, paper compositions and textile compositions. In particular, these pigments may be used in aqueous compositions, including, for example, automotive and industrial coatings, paints, toners, adhesives, latexes, and inks. The pigments have been found to be most useful in ink compositions, especially inkjet inks. Thus, the present invention further relates to an inkjet ink composition comprising a vehicle and the polymer modified pigment of the present invention. The vehicle can be either an aqueous or non-aqueous liquid vehicle, but is preferably a vehicle that contains water. Thus, the vehicle is preferably an aqueous vehicle, and the inkjet ink composition is an aqueous inkjet ink composition. More preferably the vehicle contains greater than 50% water and includes, for example, water or mixtures of water with water miscible solvents such as alcohols.

The polymer modified pigment is present in the inkjet ink composition in an amount effective to provide the desired image quality (for example, optical density) without detrimentally affecting the performance of the inkjet ink. Typically, the polymer modified pigment is present in an amount ranging from about 0.1% to about 30% based on the weight of the ink. More or less colorant may be used depending on a variety of factors. For example, the amount of the polymer modified pigment may vary depending on the amount of attached polymeric group, particularly when the polymer comprising this group has a higher molecular weight. It is also within the bounds of the present invention to use a mixture of colorants, including, for example, a mixture of the various polymer modified pigments described herein, or mixtures of these modified pigments and unmodified pigments, such as oxidized pigments including self-dispersible oxidized pigments prepared using peroxide, ozone, persulfate, and hypohalites, other modified pigments, or both.

The inkjet ink composition of the present invention can be formed with a minimum of additional components (additives and/or cosolvents) and processing steps. However, suitable additives may be incorporated in order to impart a number of desired properties while maintaining the stability of the compositions. For example, surfactants and/or dispersants, humectants, drying accelerators, penetrants, biocides, binders, and pH control agents, as well as other additives known in the art, may be added. The amount of a particular additive will vary depending on a variety of factors but generally ranges between 0% and 40%.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be used neat or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacarith gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene- -methylstyrene-(meth)acrylic acid copolymers, styrene- -methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols, hydroxypropylene-cellulose, hydroxyethylcellulose, polyvinylpyrrolidinone, polyvinylether, starch, polysaccharides, and polyethyleneimines with or without being derivatized with ethylene oxide and propylene oxide; and the like. Additional examples of water-soluble polymer compounds include various dispersants or surfactants described above, including, for example, styrene-acrylic acid copolymers, styrene-acrylic acid-alkyl acrylate terpolymers, styrene-methacrylic acid copolymers, styrene-maleic acid copolymers, styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers or may be a water dispersible polyurethane or polyester.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an OH⁻ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH⁻ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate conventional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition can be purified and/or classified using methods such as those described above for the modified pigments of the present invention. An optional counterion exchange step can also be used. Thus, unwanted impurities or undesirable large particles can be removed to produce an ink with good overall properties.

The present invention further relates to an inkjet ink set which comprises various inkjet ink compositions and includes the inkjet ink composition of the present invention. The inkjet ink compositions of this set may differ in any way known in the art. For example, the inkjet ink set may comprise inkjet ink compositions comprising different types and/or colors of pigments, including, for example, an inkjet ink composition comprising a cyan pigment, an inkjet ink composition comprising a magenta pigment, and/or an inkjet ink composition comprising a black pigment. Other types of inkjet ink compositions may also be used, including, for example, compositions comprising agents designed to fix the inkjet ink compositions onto the substrate. Other combinations will be known in the art.

The present invention will be further clarified by the following examples, which are intended to be only exemplary in nature.

EXAMPLES

For each of the following examples, unless otherwise noted, the mean volume pigment particle sizes (mv) were measured using a Nanotrac 250 dynamic light scattering particle analyzer manufactured by Microtrac Inc. Large particle count (LPC) was measured using an Accusizer 780, an optical particle sizer from PSS NICOMP. Surface tension was measured using a Kruss K-10 digital tensiometer. Viscosity was measured using a Brookfield LV-DVII+ viscometer. Sodium numbers (Na$^+$) were measured using an ion selective electrode. The polymer/pigment ratio was calculated using the following equation.

$$\text{(Polymer/Pigment)} = \frac{(\% \text{ Solid} - \% \text{ Pigment})}{\% \text{ Pigment}}$$

% Solids is determined by heating the dispersion in a 110° C. oven and measuring the weight of the residual solid. % Pigment is determined by a UV-vis spectral analytical method. The absorbance of the diluted dispersion at 550 nm is measured and compared with standard solutions made at known % pigment.

Examples 1-2

The following examples relate to an embodiment of the present invention in which the non-reactive diluent is a water soluble polymer that does not contain acidic functional groups.

Example 1

To a Brabender kneader equipped with roller blades heated to 66° C. rotating at 60 rpm was added Black Pearls® 700 carbon black (26 g, commercially available from Cabot Corporation), water (44 g), methane sulfonic acid (2 g), and 4-aminobenzyl amine (4ABA, 1.25 g). A solution of sodium nitrite (0.72 g solids in 5 g water) was added to this kneading mixture over a period of 30 minutes, and the mixture was allowed to react for an additional 30 minutes to form a modified pigment comprising carbon black having attached benzyl amine functional groups.

To this was added an aqueous sodium hydroxide solution (0.83 g sodium hydroxide dissolved in 2 g water). The temperature was increased to 85° C., and 26 g polyethyleneglycol dimethyl ether (MW 2000) was added as the non-reactive diluent. After heating to 100° C., 13 g of Joncryl 683 (a styrene acrylic acid copolymer available from BASF having a weight average molecular weight 8000 and an acid number of 165 mg KOH/g polymer) was added. The weight ratio of the non-reactive diluent to the polymer was 2:1, and the weight ratio of the polymer and the non-reactive diluent to the modified pigment was approximately 3:1. The resulting reaction mixture was then heated to 170° C. and held for 60 minutes to produce a mixture comprising a polymer modified pigment and the non-reactive diluent. The resulting mixture was cooled and removed from the Brabender as a brittle solid. 60.81 g of this mixture were dispersed in 627.5 g water with 25.12 g sodium hydroxide using a Silverson brand rotor-stator device at 4000 rpm for 90 minutes. This dispersion was concentrated by diafiltration to 250 mL and then purified by diafiltration with 2.5 L of 0.1 M sodium hydroxide solution followed by 1.25 L water. During the diafiltration, the non-reactive diluent, which is water soluble, was removed. The resulting dispersion, which was an aqueous dispersion of a polymer modified pigment, was then sonicated and was found to have a mean volume particle size (mV) of 171 nm, a large (>0.5 microns) particle count (LPC) of 5.6E7/cc, and a sodium number of 8355 ppm. The polymer content by TGA was 15.5%.

Example 2

To a Brabender kneader equipped with roller blades heated to 60 C rotating at 40 rpm was added 80 g of the modified carbon black described in Example 1, 125 g Carbowax Sentry PE68 (a low molecular weight water soluble polyethylene glycol available from Dow) as the non-reactive diluent, and 125 g of a styrene-acrylic acid copolymer (Joncryl 683, having a weight average molecular weight of 4000 and an acid number of 165 mg KOH/g polymer). The weight ratio of the non-reactive diluent to the polymer was 1:1, and the weight ratio of the polymer and the non-reactive diluent to the modified pigment was approximately 3:1. The resulting reaction mixture was heated to 176° C. and held for 60 minutes with the blades rotating at 60 rpm to produce a mixture comprising a polymer modified pigment and the non-reactive diluent. The resulting mixture was cooled and removed from the Brabender as a brittle solid. 40.2 g of this mixture were dispersed in 364.7 g 1M sodium hydroxide solution using a Silverson brand rotor-stator device at 4000 rpm for 90 minutes. This dispersion was concentrated by diafiltration to 250 mL and then purified by diafiltration with 2.5 L 0.1 M sodium hydroxide solution followed by 1.25 L water. During the diafiltration, the non-reactive diluent, which is water soluble, was removed. The resulting dispersion, which was an aqueous dispersion of a polymer modified pigment, was diluted to 2% solids, centrifuged for 2 hours at 4500 g, and then concentrated to 23.1% solids by diafiltration. This was found to have a mean volume particle size (mv) of 166 nm, a large (>0.5 microns) particle count (LPC) of 2.0E9/cc, and a sodium number of 9306 ppm. The polymer content by TGA was 18.5%.

Examples 3-5

The following examples relate to a specific embodiment of the present invention in which the polymer modified pigment is prepared under low viscosity mixing conditions using a polymer having a low acid number.

For each of these examples, a modified carbon black was used that was prepared as follows. Black Pearls® 880 carbon black (700 g, commercially available from Cabot Corporation), water (659 g), methane sulfonic acid (20.2 g dissolved in 400 g water), and 3-aminobenzyl amine (3ABA, 13.5 g, 0.15 mmoles/g treatment level) were combined in a high-solids Processall mixer, heated to 70° C., and mixed for 15 minutes. A solution of sodium nitrite (7.9 g dissolved in 60 mL water) was added into the reactor over 30 minutes, to form a modified pigment comprising carbon black having attached benzyl amine functional groups as a pigment slurry at 40% solids, which was used without further purification.

Polymer modified pigments were prepared by combining this modified pigment, a polymer, and a non-reactive diluent using the following general procedure. For each of these examples, the weight ratio of the non-reactive diluent to the polymer was 6.5:1, and the weight ratio of the polymer and the non-reactive diluent to the modified pigment was 3:1 (thus, the weight ratio of polymer to the modified pigment was 0.4:1). The specific types of components and conditions for each example are shown in Table 1 below (the torque values shown represent stirring conditions using a power of less than or equal to 50 watts).

TABLE 1

| Example # | Polymer | Diluent | Total Time | Torque |
|---|---|---|---|---|
| 3 | Joncryl 586 | PEGDME 2000 | 53 min | 0.3 N·m |
| 4 | Joncryl 586 | PEGDME 2000 | 50 min | 0.2 N·m |
| 5 | Joncryl 99 | PEGDME 2000 | 75 min | 4.2 N·m |

A Haake rheomix 3000p, equipped with roller blades turning at 60 rpm, was heated to 130° C. Once hot, 182 g of polyethylene glycol dimethyl ether having a molecular weight of 2000 (PEGDME 2000) as the non-reactive diluent was added and allowed to melt. To the PEGDME 2000 was added 28 g of polymer, which was also allowed to melt. For Examples 3 and 4, the polymer was Joncryl 586, which is a styrene-acrylic acid copolymer having a weight average molecular weight of 4600 and an acid number of 108 g KOH/g polymer, and, for Example 5, the polymer was Joncryl 99, which is a styrene-acrylate ester-acrylic acid polymer having a weight average molecular weight of 30,000 and an acid number of 95 g KOH/g polymer. To this the modified pigment dispersion described above (70 g of modified pigment on a dry basis) was added slowly, allowing for the removal of water. As the components were combined, the resulting reaction mixture was found to be extremely fluid (i.e. a low viscosity mixture), and no torque increase was observed (i.e., no increase in power was needed). The reaction mixture was reacted at 60 rpm and 130° C. for 1 hour, and the mixture, which comprised a polymer modified pigment and the non-reactive diluent, was allowed to cool. The mixture hardened to a waxy solid that was brittle enough to chip out of the Haake and collect.

Using a Waring commercial blender (Model number 51BL20) the waxy mixture was ground into a powder, taking care not to overgrind and melt the non-reactive diluent in the mixture. A stoichiometric amount of sodium hydroxide (14.73 g) and the remainder water were added to produce a 20% solids aqueous dispersion of the mixture. The dispersion was removed from the blender, and the pH adjusted to 12.5 with sodium hydroxide while mixing with a mixer blade set on 600 rpm for 90 minutes. This pH was maintained during the purification. The dispersion of the mixture was sonicated using a Misonex s-4000 for 40 minutes and a total of 430,000 Joules and diafiltered with 6.5 volumes of water, to remove non-reactive diluent and produce a dispersion of a polymer modified pigment having a mean volume particle size (mv) of 208 nm. The dispersion was then sonicated for 2 hours at approximately 900,000 Joules, diafiltered with 13 volumes of water, centrifuged using a Beckman L80 at 4000 rpm for 30 minutes, and filtered using a 0.5 micron Pall filter. The properties of the resulting dispersion of polymer modified pigment are shown in Table 2 below.

TABLE 2

| | Example # | | |
|---|---|---|---|
| | 3 | 4 | 5 |
| % solids | 8.9 | 9.4 | 9.3 |
| polymer/pigment | 0.24 | 0.25 | 0.25 |
| mV | 137 nm | 133 nm | 100 nm |
| surface tension | n/a | 61.8 | 60.9 |
| pH | n/a | 9.25 | 9.07 |
| viscosity | n/a | 2.08 cP | n/a |
| LPC (>0.5 micron) | 4.20E9/cc | 5.40E9/cc | 9.70E9/cc |
| $Na^+$ | 7957 ppm | 5836 ppm | n/a |

* n/a = not available

The results show that polymer modified pigments can be prepared using the method of the present invention using polymers having low acid numbers, resulting in stable aqueous dispersions. It would be expected that these stable aqueous dispersions could be used to formulate inkjet ink compositions of the present invention having good overall properties.

Examples 6-7

The following examples relate to a specific embodiment of the present invention in which the polymer modified pigment is prepared under low viscosity mixing conditions using a polymer having a low acid number.

For each of these examples, a modified carbon black dispersion was prepared as described in Examples 3-5 above, with the exception that 3-aminobenzyl amine was used at a 1.0 mmoles/g treatment level. Polymer modified pigments were prepared by combining this modified pigment, a polymer, and a non-reactive diluent using the following general procedure. For each of these examples, the polymer was Joncryl 99, which is a styrene-acrylate ester-acrylic acid polymer having a weight average molecular weight of 30,000 and an acid number of 95 g KOH/g polymer, and the non-reactive diluent was PEGDME 2000, which is a polyethylene glycol dimethyl ether having a molecular weight of 2000. For Example 6, the weight ratio of the non-reactive diluent to the polymer was 16:1, and the weight ratio of the polymer and the non-reactive diluent to the modified pigment was 4.25:1 (thus, the weight ratio of the polymer to the modified pigment was 0.25:1). For Example, 7, the weight ratio of the non-reactive diluent to the polymer was 10:1, and the weight ratio of the polymer and the non-reactive diluent to the modified pigment was 4.4:1 (thus, the weight ratio of the polymer to the modified pigment was 0.4:1).

A jacketed stainless steel beaker was loaded with the non-reactive diluent and stirred using a disperser blade. The beaker was heated to 120° C. using an oil heater. To this was added the polymer, and this was allowed to melt. Once melted, the modified pigment dispersion was added slowly, allowing for the removal of water. Once all of these components were combined, the temperature was increased to 135° C. and held for 1 hour. At the end of the hold, the temperature was decreased to 85° C., and 1 equivalent of base (dissolved in water—approximately 4:1 water to modified pigment) heated to >60° C. was added to the reaction mixture, which was then held at 85° C. for 0.5 hours.

After cooling to room temperature, the resulting mixture, which comprised a polymer modified pigment and the non-reactive diluent, was sonicated for 1 hour using a Misonex s-4000, poured through a 125-micron mesh sieve, and diafiltered with 20 volumes of water to remove the non-reactive diluent. After diafiltration, the resulting dispersion was again sonicated using a Misonex s-4000 to a volume average particle size of <130 nm, centrifuged using a Beckman L80, and filtered using a 0.5 micron Pall filter. The properties of the resulting dispersion of polymer modified pigment are shown in Table 3 below.

TABLE 3

| | Example # | |
|---|---|---|
| | 6 | 7 |
| % solids | 9.6 | 10.0 |
| polymer/pigment | 0.3 | 0.34 |

TABLE 3-continued

| | Example # | |
|---|---|---|
| | 6 | 7 |
| mV | 143 nm | 148 nm |
| surface tension | 56.7 | 53.4 |
| pH | 9.12 | 8.94 |
| viscosity | 5.26 cP | 6.90 cP |
| LPC (>0.5 micron) | 7.8E8/cc | 1.6E9/cc |
| Na$^+$ | 10940 ppm | 11940 ppm |

The results show that polymer modified pigments can be prepared using the method of the present invention under low viscosity mixing conditions using polymers having low acid numbers, resulting in stable aqueous dispersions. It would be expected that these stable aqueous dispersions of polymer modified pigments could be used to formulate inkjet ink compositions of the present invention having good overall properties.

Example 8

The following example relates to a specific embodiment of the present invention in which the polymer modified pigment is prepared under low viscosity mixing conditions using a polymer having a low acid number.

A modified carbon black dispersion was prepared as described in Examples 3-5 above. A polymer modified pigment was prepared by combining this modified pigment, a polymer, and a non-reactive diluent using the general procedure described in Examples 6-7 above. For this example, the polymer was Joncryl 586, which is a styrene-acrylic acid copolymer having a weight average molecular weight of 4600 and an acid number of 108 g KOH/g polymer, and the non-reactive diluent was PEGDME 2000, which is a polyethylene glycol dimethyl ether having a molecular weight of 2000. The weight ratio of the non-reactive diluent to the polymer was 10:1, and the weight ratio of the polymer and the non-reactive diluent to the modified pigment was 4.4:1 (thus, the weight ratio of the polymer to the modified pigment was 0.4:1).

The properties of the resulting dispersion of polymer modified pigment are shown in Table 4 below.

TABLE 4

| | Example # 8 |
|---|---|
| % solids | 9.9 |
| polymer/pigment | 0.32 |
| mV | 128 nm |
| surface tension | 55.8 |
| pH | 9.38 |
| viscosity | 2.18 cP |
| LPC (>0.5 micron) | 6.2E8/cc |
| Na$^+$ | 5836 ppm |

The results show that polymer modified pigments can be prepared using the method of the present invention under low viscosity mixing conditions using polymers having low acid numbers, resulting in stable aqueous dispersions. It would be expected that this stable aqueous dispersion of polymer modified pigment could be used to formulate an inkjet ink composition of the present invention having good overall properties.

Comparative Example 1

A polymer modified pigment dispersion was prepared using the procedure described in Example 4 above, with the exception that the polymer was Vancryl 68 (a styrene-acrylic acid copolymer having a weight average molecular weight of 16,800 and an acid number of 160 mg KOH/g polymer), which is a high acid number polymer. The properties of the resulting dispersion of comparative polymer modified pigment are shown in Table 5 below.

TABLE 5

| | Example # Comp Ex 1 |
|---|---|
| % solids | 10.7 |
| polymer/pigment | 0.42 |
| mV | 112 nm |
| surface tension | 51.9 |
| pH | 9.22 |
| viscosity | 3.62 cP |
| LPC (>0.5 micron) | 9.2E8/cc |
| Na$^+$ | 16142 ppm |

Comparative Example 2

A polymer modified pigment was prepared using a procedure similar to that described in Example 4 above, with the exception that no non-reactive diluent was present. The weight ratio of polymer to pigment was 3:1. However, based on the results of a diafiltration experiment with Joncryl 586, it was found that this polymer was difficult to remove by diafiltration. Only 80% of the polymer could be removed by diafiltering an aqueous solution of Joncryl 586 using up to 30 volumes of water, and even less was removed using an aqueous sodium hydroxide solution. It would be expected that, in the presence of a pigment, even less of the polymer would be removed. Thus, since an excess of polymer was needed to form the modified pigment of this comparative example, and since much less than 80% would be removed by diafiltration, the resulting polymer modified pigment, prepared using this low acid polymer, would be expected to have a weight ratio of polymer to modified pigment of at least 0.6:1, with a substantial amount of that being unattached polymer. The presence of such an excess of polymer would be expected to have a negative impact on the performance properties of an inkjet ink composition comprising this modified pigment.

Example 9 and Comparative Example 3

An inkjet ink composition of the present invention was prepared using the aqueous pigment dispersion of polymer modified pigment of Example 4. In addition, a comparative inkjet ink composition was prepared using the aqueous dispersion of comparative polymer modified pigment of Comparative Example 1. The formulation used for each of these inkjet ink compositions is shown in Table 6 below (the weight percent of pigment is on a dry basis).

TABLE 6

| Component | Weight % |
|---|---|
| pigment | 4 |
| trimethylol propane | 7 |
| glycerin | 7 |
| diethylene glycol | 5 |
| Surfynol 465 | 1 |
| water | 76 |

The thermal inkjet ink compositions were printed using a Canon iP4000 thermal inkjet ink printer. Each thermal inkjet ink composition was loaded into a Canon compatible cartridge (available from Inkjet Warehouse) and printed with the following printer settings: print quality: high. Plain papers, grey scale, and no photo options selected. Images were printed on Xerox 4200 (X4200) and Xerox 4200 coated with a magnesium salt containing fixer composition (15 wt % trimethylolpropane, 15 wt % polyethylene glycol (having a weight average molecular weight of 200), 0.2 wt % lithium acetate, 18 wt % magnesium nitrate, 1 wt % Surfynol 465, and 50.8 wt % water) by applying this fixer composition to the paper using an Epson printer and a C88 cartridge (X4200Mg). The optical density (OD) of the resulting printed images, after 24 hours was measured and are shown in Table 7 below.

TABLE 7

| Example # | Polymer | Acid number | X4200 | X4200 Mg |
|---|---|---|---|---|
| 9 | Joncryl 586 | 108 | 1.14 | 1.46 |
| Comp Ex 3 | V-68 | 165 | 0.96 | 1.39 |

As the results show, images produced by printing the comparative inkjet ink composition, which comprised the comparative polymer modified pigment prepared using a high acid number polymer, had a lower optical density than images produced by printing the inkjet ink composition of the present invention, which comprised the polymer modified pigment of the present invention prepared using a low acid number polymer. Also, as Comparative Example 2 above shows, an inkjet ink composition comprising a polymer modified pigment prepared using the same low acid polymer could not be prepared since the polymer modified pigment could not be purified to remove excess polymer.

Example 10

The following example relates to a specific embodiment of the method of the present invention in which the modified pigment is prepared in the presence of the polymer and non-reactive diluent.

To a Brabender kneader equipped with roller blades heated to 60° C. rotating at 44 rpm was added 90 g Black Pearls® 700 carbon black (commercially available from Cabot Corporation), 135 g Carbowax Sentry PE68 (a low molecular weight water soluble polyethylene glycol available from Dow) as the non-reactive diluent, 18.5 g of a styrene-acrylic acid copolymer (Joncryl 683 having a number average molecular weight of 4000 and an acid number of 165 mg KOH/g polymer), 6.92 g methane sulfonic acid, and 4.32 g 4-aminobenzyl amine (4-ABA). Water (15.6 g) was added to cool and allow mixing. An aqueous solution of sodium nitrite (2.48 g solids in 4 g water) was added to this kneading mixture over a period of 30 minutes. After an additional 30 minutes to form the modified pigment, 2.88 g sodium hydroxide (dissolved in water) was added to the kneading mixture, followed by an additional 26.5 g of the styrene acrylic acid copolymer (Joncryl 683). This mixture was heated to 150° C. and held for 60 minutes to produce a mixture comprising a polymer modified pigment and the non-reactive diluent, which was cooled and removed from the Brabender as a brittle solid. 60.81 g of this mixture were dispersed in 400 g 1 M sodium hydroxide solution using a Silverson brand rotor-stator device at 4000 rpm for 90 minutes. This dispersion was sonicated for 60 minutes and then purified by diafiltration with 4 L 0.1 M sodium hydroxide solution followed by 2 L water. During the diafiltration, the non-reactive diluent, which is water soluble, was removed. The resulting dispersion, which was an aqueous dispersion of a polymer modified pigment, was found to have a mean volume particle size (mv) of 134 nm, a large (>0.5 microns) particle count of 1.1E8/cc, and a sodium number of 6166 ppm. The polymer content by TGA was 11.0%.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of preparing a polymer modified pigment comprising the steps of:
   i) combining, in any order, a modified pigment comprising a pigment having attached at least one reactive group, a polymer comprising at least one functional group, the polymer having an acid number ranging from 30 to 150, and a non-reactive diluent, to form a reaction mixture, wherein the functional group of the polymer is capable of reacting with the reactive group of the modified pigment and wherein the non-reactive diluent and the polymer are combined in a ratio of at least about 1 part non-reactive diluent to 1 part polymer;
   ii) reacting the polymer and the modified pigment in the reaction mixture to form a mixture comprising the polymer modified pigment and the non-reactive diluent; and
   iii) removing the non-reactive diluent from the mixture to form the polymer modified pigment, wherein the polymer modified pigment comprises the pigment having attached at least one polymeric group, and wherein the polymeric group comprises the polymer.

2. The method of claim 1, wherein steps i), ii) or both occur by stirring with a power of less than or equal to 50 watts.

3. The method of claim 1, wherein the modified pigment comprises the pigment having attached at least one organic group, wherein the organic group comprises the reactive group.

4. The method of claim 1, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

5. The method of claim 1, wherein the pigment is carbon black.

6. The method of claim 1, wherein the reactive group of the modified pigment is a nucleophilic group and the functional group of the polymer is an electrophilic group.

7. The method of claim 1, wherein the reactive group of the modified pigment is an electrophilic group and the functional group of the polymer is a nucleophilic group.

8. The method of claim 1, wherein the reactive group of the modified pigment or the functional group of the polymer is a carboxylic acid group, an anhydride group, an amine group, or salts thereof.

9. The method of claim 1, wherein the reactive group of the modified pigment is an alkyl amine or salt thereof or is an alkyl sulfate.

10. The method of claim 1, wherein the functional group of the polymer is a carboxylic acid group or salt thereof or is an anhydride group.

11. The method of claim 1, wherein the polymer is in the form of a polymer melt.

12. The method of claim 1, wherein the polymer has an acid number of between about 30 and 100.

13. The method of claim 1, wherein the polymer has an acid number of between about 100 and 150.

14. The method of claim 1, wherein the polymer has a weight average molecular weight of less than or equal to about 50,000.

15. The method of claim 1, wherein the polymer has a weight average molecular weight of greater than or equal to about 1,000.

16. The method of claim 1, wherein, in step i), the non-reactive diluent and the polymer are combined in a ratio of at least about 3 parts non-reactive diluent to 1 part polymer.

17. The method of claim 1, wherein, in step i), the non-reactive diluent and the polymer are combined in a ratio of at least about 10 parts non-reactive diluent to 1 part polymer.

18. The method of claim 1, wherein, in step i), the non-reactive diluent, the polymer, and the modified pigment are combined in a ratio of at least about 1.0 part non-reactive diluent and polymer to 1.0 part modified pigment.

19. The method of claim 1, wherein, in step i), the non-reactive diluent, the polymer, and the modified pigment are combined in a ratio of less than or equal to about 6.5 parts non-reactive diluent and polymer to 1.0 part modified pigment.

20. The method of claim 1, wherein the non-reactive diluent is a non-water miscible oil or resin, an inorganic salt having a melting point less than or equal to about 120° C., a water soluble non-acidic polymer, or a non-aqueous solvent having a boiling point greater than or equal to 150° C.

21. The method of claim 1, wherein the step of removing the non-reactive diluent further comprises adding an aqueous solvent to the mixture to form an aqueous dispersion of the polymer modified pigment.

22. The method of claim 1, wherein, in step iii), the non-reactive diluent is removed by phase separation.

23. The method of claim 1, wherein, in step iii), the non-reactive diluent is removed by filtration.

24. The method of claim 1, wherein, in step iii), the non-reactive diluent is removed by diafiltration.

25. The method of claim 1, wherein, in step iii), the non-reactive diluent is removed by distillation.

26. The method of claim 1, wherein the polymer modified pigment is in the form of a dispersion in a liquid vehicle.

27. The method of claim 26, wherein the dispersion is an aqueous dispersion.

28. The method of claim 1, wherein steps i) and ii) occur simultaneously.

29. A method of preparing a polymer modified pigment comprising the steps of:
   i) combining, in any order, a pigment, an aromatic amine, a diazotizing agent, a polymer comprising at least one functional group, the polymer having an acid number ranging from 30 to 150, and a non-reactive diluent, to form a reaction mixture, wherein the non-reactive diluent and the polymer are combined in a ratio of at least about 1 part non-reactive diluent to 1 part polymer;
   ii) reacting the pigment, the aromatic amine, and the diazotizing agent in the reaction mixture to form a modified pigment comprising the pigment having attached at least one reactive group, wherein the reactive group of the modified pigment is capable of reacting with the functional group of the polymer;
   iii) reacting the polymer and the modified pigment in the reaction mixture to form a mixture comprising the polymer modified pigment and the non-reactive diluent; and
   iv) removing the non-reactive diluent from the mixture to form the polymer modified pigment, wherein the polymer modified pigment comprises the pigment having attached at least one polymeric group, and wherein the polymeric group comprises the polymer.

30. The method of claim 29, wherein step ii) and iii) occur simultaneously.

31. The method of claim 29, wherein step i), ii), and iii) occur simultaneously.

32. A polymer modified pigment comprising a pigment having attached at least one polymeric group, wherein the polymer modified pigment comprises the reaction product of a modified pigment comprising the pigment having attached at least one reactive group and a polymer comprising at least one functional group, wherein the functional group of the polymer reacts with the reactive group of the modified pigment, wherein the polymer has an acid number of between about 30 and 110, and wherein the polymer modified pigment has a weight ratio of polymer to modified pigment of less than or equal to 2:1.

33. An inkjet ink composition comprising a liquid vehicle and a polymer modified pigment comprising a pigment having attached at least one polymeric group, wherein the polymer modified pigment is the reaction product of a modified pigment having attached at least one reactive group and a polymer comprising at least one functional group, wherein the functional group of the polymer reacts with the reactive group of the modified pigment, wherein the polymer has an acid number of between about 30 and 110, and wherein the polymer modified pigment has a weight ratio of polymer to modified pigment of less than or equal to 2:1.

* * * * *